Figure 1:
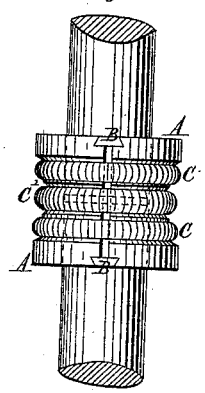

(No Model.)

J. H. SMITH & R. MARSHALL.
PACKING FOR STUFFING BOXES OF PISTON RODS, &c.

No. 317,869. Patented May 12, 1885.

Witnesses.

Inventors
James H. Smith.
Robert Marshall,
By James L. Norris,
Atty.

UNITED STATES PATENT OFFICE.

JAMES HENRY SMITH, OF EUSTON ROAD, AND ROBERT MARSHALL, OF EARLHAM GROVE, COUNTY OF MIDDLESEX, ENGLAND; SAID SMITH ASSIGNOR OF HIS RIGHT TO SAID MARSHALL, AND SAID MARSHALL ASSIGNOR OF ONE-HALF TO GEORGE HERBERT ADAIR THUNDER, OF CATHCART ROAD, SOUTH KENSINGTON, COUNTY OF MIDDLESEX, ENGLAND.

PACKING FOR STUFFING-BOXES OF PISTON-RODS, &c.

SPECIFICATION forming part of Letters Patent No. 317,869, dated May 12, 1885.

Application filed February 12, 1885. (No model.) Patented in England January 14, 1884, No 1,428.

*To all whom it may concern:*

Be it known that we, JAMES HENRY SMITH and ROBERT MARSHALL, citizens of England, residing, respectively, at Euston Road and at Earlham Grove, both in the county of Middlesex, England, have invented a new and useful Improved Packing for the Stuffing-Boxes of Piston-Rods and other Rods Requiring Packing, (for which we have obtained a patent in Great Britain, No. 1,428, bearing date the 14th January, 1884,) of which the following is a specification.

According to our present invention we construct packing for the stuffing-boxes of piston and other rods of rings or coils of either metal or other packing material, whether hard or soft, through which rings or coils the rod passes, and we encircle such packing-rings with helical or other circular springs in tension, so that they tend to keep the rings or coils pressed tightly against the rod as the packing wears. As a certain space intervenes between the inner wall of the stuffing-box and the packing-rings, in which space the helical springs are contained, we utilize this space by filling it with lubricating material. When metal packing-rings are used, we prefer to form a circular groove on the outer surface of each ring, into which groove the helical spring fits, so as to insure its always being kept in position.

The said packing-rings and springs may be introduced directly into the stuffing-box; but by preference we inclose them in a casing which is formed in two parts secured together, and which has a central hole at each end, so as to allow the piston or other rod to pass through, the casing with the packing being introduced into the stuffing-box and made to bear either directly upon the end surfaces thereof or upon interposed packing material. The inner end surfaces of the casing are faced true, so that the packing-rings bear steam-tight against them. When the packing consists of two or more rings, these are pressed outward in opposite directions against the end surfaces of the casing by forming their inner ends with beveled surfaces, upon which acts either one of the before-described circular springs or a correspondingly-beveled ring that is pressed inward by one of the springs. The rings of packing are formed into two or more separate pieces, and the joints are made steam-tight by the insertion of wedge-shaped tongue-pieces between the correspondingly-inclined end surfaces of the parts of the ring, so that when these are pressed inward by the springs they in their turn tend to force the tongues inward. The said end surfaces of the rings are by preference formed with dovetail or undercut grooves to retain the tongues.

In order to insure an accurate fit of the packing-rings round the piston or other rod, we by preference cut on the inner surfaces of the packing-rings a very fine screw-thread or circular threads, which are quickly worn off by the friction of the piston-rod at those points where the rings fit the latter more closely than at others.

The above improved packing has the advantages that it is kept steam-tight with the smallest amount of friction on the rod; that it is elastic, and causes no undue strain at any point; that it is always uniform in fit and prevents all grooving and cutting of the rod, and that it is automatic in its action, requiring no screwing up of the gland after this is once screwed home.

Figure 3:
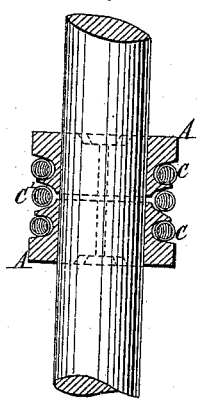
Figure 2:
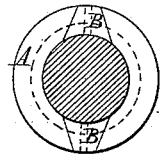

Figure 1 of the accompanying drawings shows an elevation of one arrangement of the before-described improved packing in which metal packing-rings are employed. Fig. 2 shows a plan, and Fig. 3 a vertical section.

Figure 4:
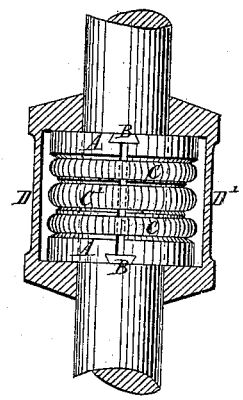
Figure 6:
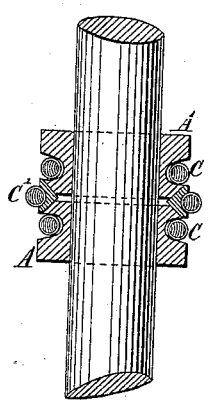
Figure 5:
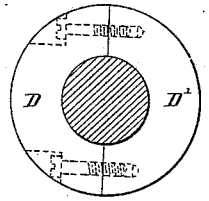

The packing-rings A are made in halves, and the joints made steam-tight against the piston-rod by wedge-shaped tongue-pieces B. They have grooves into which fit the circular helical springs C C, introduced therein in a state of tension, so that by their pressure upon the packing-rings they always maintain these in steam-tight contact with the piston-rod, sufficient space being left between the halfrings to allow for wear. In the arrangement shown there are two separate packing-rings A A, the meeting ends of which have beveled surfaces, forming together a circular groove into which is introduced another circular helical spring, C', under tension, so that its inward pressure tends to force the two rings apart, so as to bear with their accurately-turned outer end surfaces against the surfaces of the stuffing-box, or against the surfaces of the beforementioned casing, when such is employed; or a wedge-shaped ring in halves might be fitted against the beveled surfaces of the ring A and pressed inward by the spring C', embracing the same, as shown at Fig. 6. Fig. 4 shows a vertical section, and Fig. 5 a plan, of the beforementioned casing, which is made in two halves, D D', so as to embrace the packing when this is fitted upon the piston-rod, the halves being secured together by means of screws or dowel-pins. The outer surfaces of this casing are made to fit the inner surfaces of the ordinary stuffing-box to which the packing is applied.

It will be evident that when the piston-rods are of large diameter the packing-rings A may be made in more than two separate pieces.

Having thus described the nature of our invention and the best means we know for carrying it out in practice, we claim—

1. The combination of the two separate annularly-grooved packing-rings A A, each divided longitudinally into two halves, the wedge-shaped tongue-pieces B B, interposed, respectively, between the adjacent longitudinal edges of the halves of the rings, and springs C, under tension, encircling the rings and tongue-pieces, for holding the parts in position by their action on the ring-sections, causing the latter to press the tongue-pieces directly against the piston or other rod, substantially as described.

2. The combination of the two separate annularly-grooved packing-rings A A, each divided longitudinally into two halves and having their meeting ends provided with beveled surfaces, with the wedge-shaped tongue-pieces B B, interposed, respectively, between the adjacent longitudinal edges of the halves of the rings, and springs C, under tension, arranged, respectively, in the grooves of the rings and between the meeting ends of the rings, for forcing the rings apart and also clamping them upon the tongue-pieces, and thereby causing the halves of the ring to force the tongue-pieces upon the piston or other rod, substantially as described.

In testimony whereof we have signed our names to this specification, in the presence of two subscribing witnesses, this 21st day of January, A. D. 1885.

JAMES HENRY SMITH.
ROBERT MARSHALL.

Witnesses:
JNO. P. M. MILLARD,
CHAS. BERKLEY HARRIS.